United States Patent [19]

Sakuma et al.

[11] Patent Number: 5,197,096
[45] Date of Patent: Mar. 23, 1993

[54] SWITCHING METHOD AND APPARATUS HAVING SUBSCRIBER STATE MANAGEMENT FUNCTION

[75] Inventors: Tetsuo Sakuma, Sagamihara; Noboru Mizuhara, Kawasaki; Tomoaki Tsunoda, Sagamihara; Junko Yamagishi, Kodaira, all of Japan

[73] Assignees: Hitachi, Ltd.; Hitachi Microcomputer Engineering Ltd., both of Tokyo, Japan

[21] Appl. No.: 540,178

[22] Filed: Jun. 19, 1990

[30] Foreign Application Priority Data

Jun. 23, 1989 [JP] Japan .................. 1-162269

[51] Int. Cl.[5] ............................................. H04M 3/42
[52] U.S. Cl. .................................... 379/211; 379/201; 379/210
[58] Field of Search .............. 379/210, 211, 212, 201, 379/245

[56] References Cited

U.S. PATENT DOCUMENTS

| 4,313,035 | 1/1982 | Jordan et al. | 379/211 |
| 4,752,951 | 6/1988 | Konneker | 379/211 |
| 4,852,156 | 7/1989 | Shigenaga | 379/216 X |

FOREIGN PATENT DOCUMENTS

| 13795 | 1/1986 | Japan | 379/211 |
| 95693 | 5/1986 | Japan | 379/211 |
| 62-179258 | 8/1987 | Japan . | |
| 263743 | 11/1987 | Japan | 379/211 |
| 63-42558 | 2/1988 | Japan . | |
| 63-42559 | 2/1988 | Japan . | |
| 246944 | 10/1989 | Japan | 379/211 |

Primary Examiner—James L. Dwyer
Assistant Examiner—Ahmad F. Matar
Attorney, Agent, or Firm—Fay, Sharpe, Beall, Fagan, Minnich & McKee

[57] ABSTRACT

A switching system is provided in which when a calling subscriber has transmitted an identification (ID) number of a called subscriber and an ID number of the calling subscriber from a calling terminal to a switching equipment having a subscriber control table at the time of making a call, the switching equipment receives the ID numbers and connects the calling terminal with the called terminal. In response to an input of an ID number of a called subscriber and an ID number of a calling subscriber by the calling subscriber to a terminal at the time of making a call, the switching equipment changes a registration state corresponding to the ID number of the calling subscriber in the subscriber control table from an idle state to a busy state, manages the idle and busy states of the subscriber himself or herself corresponding to the ID number, retrieves the subscriber control table in response to a reception of a call signal which designates an ID number of a called signal from a calling subscriber, and forwards the call to a default terminal which has been registered in advance by the called subscriber having the ID number, when the terminal corresponding to the called subscriber having the ID number is busy and the called subscriber having the ID number himself or herself is not busy as a result of the retrieval of the subscriber control table.

8 Claims, 9 Drawing Sheets

: STATE

: INPUT

: OUTPUT

: ANALYSIS

: PROCESSING

SWITCHING METHOD AND APPARATUS HAVING SUBSCRIBER STATE MANAGEMENT FUNCTION

BACKGROUND OF THE INVENTION

The present invention relates to a method and apparatus for communication switching having a service function, and more particularly, to a switching system having a subscriber state management function which can switch by using identification (ID) numbers and can manage states of subscribers who are in communication, with ID numbers of the subscribers.

A conventional telephone exchange system serves those telephone sets which have their own telephone numbers and connects a calling telephone set with a called telephone set by receiving a telephone number of the called telephone set. In this case, a telephone number corresponds to an accommodation terminal of the switching equipment so that the switching equipment can discriminate connection terminals by merely receiving a telephone number. A calling subscriber is required to call and receive calls at a fixed telephone set in accordance with the conventional telephone exchange system.

In other words, when a calling subscriber dials a telephone number of the other person corresponding to terminal accommodation positional information in the switching equipment, the switching equipment terminates the call to a subscriber line of the terminal accommodation position corresponding to the dialed telephone number, to thereby connect a calling terminal to a called terminal.

Therefore, according to the conventional system, a telephone call is forwarded to a telephone set of a subscriber corresponding to the called telephone number regardless of whether the called subscriber is near the called telephone set or not. If the called subscriber is not near the called telephone set, a third person picks up a telephone receiver to communicate with a calling subscriber and tells the calling subscriber a destination of the called subscriber with whom the calling subscriber wants to communicate, or the like.

The conventional system is extremely cumbersome for a calling subscriber because of the existence of a third person who is not a person with whom the calling subscriber wants to communicate. Further, if the third person does not know the destination of the called subscriber, there is such an inconvenient situation that the calling subscriber cannot communicate with the called subscriber. The conventional system is extremely inconvenient for a called subscriber as well particularly in such a situation when the subscriber expecting a telephone call cannot go out even if he or she wants to do so, because the subscriber must wait for the call to be received at the telephone set which is located at a fixed position. The conventional system is also cumbersome for a third person as well because he or she will have to respond to a telephone call which is not destined to this third person.

As a method for solving the above problems, there has been a personal service of a so-called "follow me" call service according to which a telephone transfer function is provided at the switching equipment or a terminal where a telephone number of a subscriber's destination is registered so that a telephone call to this subscriber is transferred to the registered destination. According to such a method, however, only the transfer function itself cannot respond to all the similar needs of such transfer in the case where only one telephone set is commonly used by a plurality of subscribers. Further, unless a called subscriber does not know a telephone number of the telephone set at his or her destination, the person cannot register a telephone number of the destination.

As methods for solving the above problems, there have been proposed JP-A-63-42558 and JP-A-63-42559, for example. According to the methods described in the above two Japanese Laid-open patent publications, a subscriber is given an ID number which applies to this individual person, and when the subscriber wants a telephone call to him or her to be received at his or her destination, the subscriber registers his or her ID number to the switching equipment from a telephone set at the destination where a call is wanted to be received. By this arrangement, the switching equipment registers the ID number by corresponding it to the registered telephone number. When there is a telephone call from other calling subscriber to the subscriber whose ID number has been registered, the switching equipment forwards the call to the telephone set having the telephone number which corresponds to the registered ID number, so that a trace connection of a call to an individual telephone number becomes possible.

According to the methods described in the above referenced publications, when a calling subscriber inputs an ID number of a called subscriber, the switching equipment discriminates a telephone number corresponding to the ID number which has been registered and forwards the call to a telephone set of the telephone number (hereinafter referred to as a terminal including a data terminal unit and a telephone set). Management of the state of the terminal as to whether the terminal is busy and the like is performed by each terminal unit.

As a result, when a terminal corresponding to an ID number of a called subscriber which has been inputted by a calling subscriber is busy, the switching equipment cannot discriminate whether the called subscriber having the ID number is busy or other subscriber is busy at this terminal. Further, according to the above methods, even if other subscriber is busy at the terminal, the switching equipment just informs the calling subscriber that the other terminal is busy. JP-A-62-179258 has disclosed a technique of managing communication switching which includes an inputting of an ID number of a calling subscriber as well when the calling subscriber makes a telephone call. However, the above problem has not been considered.

SUMMARY OF THE INVENTION

It is an object of the present invention to provide a switching method and a switching system having a subscriber state management function which enables the switching equipment to individually manage the states of the subscribers corresponding to ID numbers and which enables the subscribers to easily register their ID numbers when they move to other destinations.

It is another object of the present invention to provide a switching method and a switching system having a subscriber state management function which enables a calling subscriber to be informed that a called subscriber himself or herself is busy.

It is still another object of the present invention to provide a switching method and a switching system having a subscriber management function which enables a call to be forwarded to a terminal adjacent to a terminal which has been registered by a subscriber as a destination terminal, even if the registered terminal is busy.

In order to achieve the above objects, according to the switching system having a subscriber state management function in accordance with one of the features of the present invention, the switching equipment includes a subscriber control table for registering each state of idle and busy of a subscriber corresponding to an ID number, and when there is a call from a calling subscriber by designating an ID number of a called subscriber and an ID number of the calling subscriber, the switching equipment changes the state of the subscriber corresponding to the ID number of the calling subscriber in the subscriber control table from a flag which shows idle to a flag which shows busy, to thereby manage the states of all the subscribers. The subscriber control table has columns for registering a subscriber's ID number, a telephone number of a terminal corresponding to the subscriber and a busy flag which shows whether the subscriber having the ID number himself or herself is busy or not. Upon receiving an ID number of a called subscriber from a calling subscriber, the switching equipment retrieves an ID number which is identical with the called subscriber's ID number from the ID number column registered in the subscriber control table, and then judges from the busy flag column corresponding to the ID number whether the called subscriber himself or herself is busy or not. The subscriber control table has columns for registering a subscriber ID number, a telephone number of a terminal corresponding to the subscriber ID number, a default telephone number which has been registered beforehand by the subscribers having the subscriber ID number and a busy flag which shows whether the subscriber having the ID number is busy or not. Upon receiving a calling signal which designates an ID number of a called subscriber from a calling subscriber, the switching equipment retrieves the subscriber control table. When the terminal corresponding to the subscriber having the ID number is busy and when the subscriber having the ID number himself or herself is not busy, the switching equipment terminates the call to a terminal of the default telephone number which has been registered in advance by the subscriber having the ID number.

According to another feature of the present invention, the switching equipment includes a subscriber control table having columns for registering a subscriber ID number, a telephone number of a terminal corresponding to the subscriber ID number, a default telephone number which has been registered in advance by the subscriber having the subscriber ID number and a busy flag which shows whether the subscriber having the ID number is busy or not, and an adjacent telephone number table having a column for registering a telephone number of each terminal and a telephone number adjacent to this terminal. Upon receiving a calling signal which designates an ID number of a called subscriber from a calling subscriber, the switching equipment retrieves the subscriber control table. When the terminal corresponding to the subscriber having the ID number is busy and when the subscriber having the ID number himself or herself is not busy, the switching equipment retrieves the adjacent telephone number table, to thereby terminate the call to a terminal adjacent to the terminal.

In accordance with another feature of the present invention, upon receiving an ID number of a called subscriber from a calling subscriber, the switching equipment retrieves a number which is identical with the ID number of the called subscriber from the ID number column registered in the subscriber control table, and judges whether the called subscriber himself or herself is busy or not based on the busy flag column corresponding to the ID number. When the called subscriber is busy, the switching equipment informs the calling subscriber that the called subscriber is busy by using a busy tone which is different from a busy tone that shows that the called terminal is busy, or by displaying at the terminal of the calling subscriber that the called subscriber is busy.

Further, in accordance with still another feature of the present invention, when a calling subscriber inserts an ID card which stores his or her own ID number into a terminal, the terminal becomes in the on-hook dialing state. The calling subscriber then inputs an ID number of the called subscriber to the terminal, so that the terminal transmits the ID number of the called subscriber and the ID number of the calling subscriber which has been read from the ID card to the switching equipment. The switching equipment then registers in the subscriber control table within the switching equipment that the calling subscriber himself is busy.

In the operation of the present invention, the switching equipment can manage judgment whether a subscriber corresponding to an ID number is busy or not by having a control table which shows whether the subscriber corresponding to the ID number registered in the switching equipment is in communication or not. When a calling terminal calls other subscriber by using the ID number of the called subscriber and if the terminal of the called subscriber corresponding to this ID number is busy, but the subscriber himself or herself is not busy, the switching equipment forwards the call to a terminal adjacent to the busy terminal or to a defaulted terminal which has been registered in advance. When a calling terminal calls other subscriber by using the ID number of the called subscriber and if the called subscriber himself or herself corresponding to the ID number is busy, the switching equipment informs the calling subscriber that the called subscriber himself or herself is busy.

A calling subscriber can register in the control table of the switching equipment that the calling subscriber himself or herself is busy by a simple operation of just inserting into the terminal an ID card such as an IC card which stores the ID number, when the calling subscriber starts communication. By this arrangement, the switching equipment can manage the states of individual subscribers.

DETAILED DESCRIPTION OF THE EMBODIMENTS

Detailed description of the embodiments of the present invention will be made below with reference to the drawings.

Figure 1:
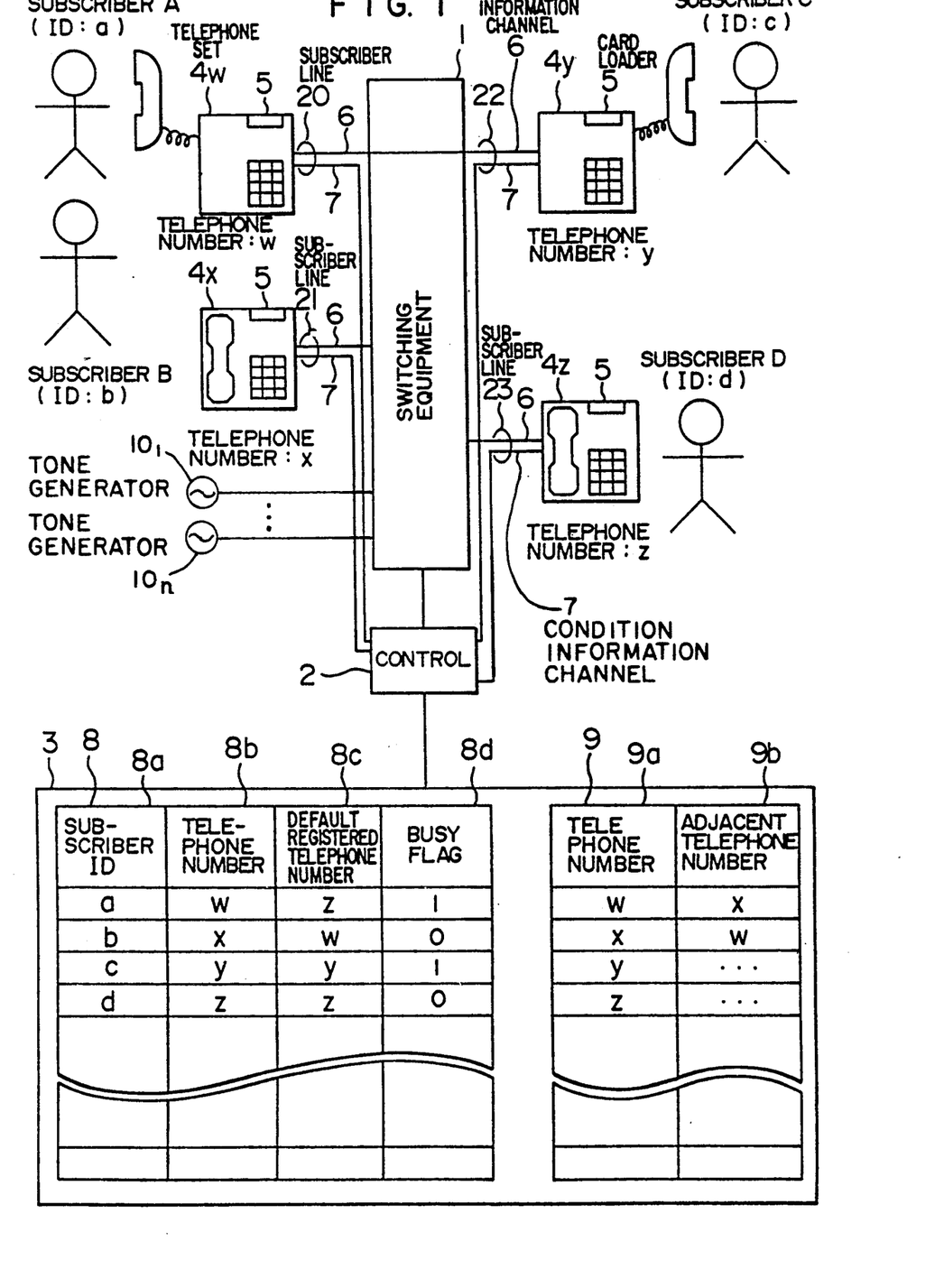
FIG. 1 is a diagram which illustrates the configuration of the switching system having a subscriber state management function and an example of setting the contents of a table showing one embodiment of the present invention.

FIG. 1 is a diagram showing the configuration of the ISDN switching system and an example of the contents of the table stored in the memory showing one embodiment of the present invention.

In FIG. 1, a reference numeral 1 designates a switching equipment, 2 a controller of the switching equipment as a whole, 3 a memory (an enlarged view) of the switching equipment, 4w a telephone set which is connected to a subscriber line 20 of a telephone number w, 4x, 4y and 4z telephone sets which are connected to subscriber lines 21, 22 and 23, respectively, 5 an ID card loading section in the telephone set, 6 an information channel in the subscriber line, 7 a control information channel, 8 a subscriber control table stored in the memory of the switching equipments, and 9 a table of adjacent telephone numbers.

The subscriber control table 8 has columns for a subscriber ID number 8a, a telephone number 8b, a default registration telephone number 8c, and a busy flag 8d. Telephone numbers w, x, y and z and default registration telephone numbers z, w, y and z are registered corresponding to subscriber ID numbers a, b, c and d. In the busy flag 8d column, a logical level "1" is set in the case of busy and a logical level "0" is set in the case of not busy. The default telephone set means a telephone set which has been registered as the one to which the subscriber has been belonging from the beginning. When the subscriber does not register his or her move, a telephone call to this subscriber is forwarded to this telephone set. The adjacent telephone number table 9 has columns of a telephone number 9a and an adjacent telephone number 9b in which adjacent telephone numbers x, w, . . . are registered corresponding to telephone numbers w, x, y and z. In this embodiment, only one adjacent telephone number is registered, but a plurality of adjacent telephone numbers can be also registered when necessary. "A" designates a subscriber who has an ID number of a, and "B", "C" and "D" similarly designate subscribers who have ID numbers b, c and d, respectively. The present embodiment exhibits the largest effect when it is applied to a private branch exchange (PBX), but almost the same effect can be also obtained when it is applied to a common public telephone exchange system.

In the case of FIG. 1, the subscriber A has inputted the ID number c of the other subscriber C and the ID number a of the calling subscriber A to the subscriber C to make a call, and the subscribers A and C are currently in the busy state. The subscriber A has inputted the ID number c of the subscriber C and the ID number a of his or her own from an optional terminal, so that the switching equipment makes the flag "1" to be written in the columns of the busy flag 8d corresponding to the subscribers ID numbers a and c respectively of the subscriber control table 8 to indicate that both subscribers are busy. It is assumed that the values shown in FIG. 1 have been set in the other columns of the subscriber control table 8 and the adjacent telephone number table 9, respectively. As is apparent from FIG. 1, the subscriber A has originally registered the telephone set 4z as his or her own telephone set (a default telephone set). However, because this subscriber has changed his or her work place to the place of other telephone set 4w for either a short period or a long period, this telephone number has been registered in the subscriber control table 3.

Next, an example of the operation after the state of FIG. 1 will be explained.

When the subscriber D has called the subscriber B by inputting the ID number b of the called subscriber and the ID number d of his or her own in the state shown in FIG. 1, the control unit 2 of the switching equipment retrieves a busy flag corresponding to the ID number b of the subscriber control table 8 and judges that the subscriber B having the ID number b is not busy. In this case, a telephone number corresponding to the ID number b has been registered as w. For example, the subscriber B is working at the same place as the subscriber A, and a telephone set 4x of the telephone number x is provided on the same floor of the same building. The switching equipment tries to call the called telephone set 4w, but the subscriber A is currently using the telephone set of the telephone number w as described above. Then, the switching equipment retrieves the adjacent telephone number table 9 to know the telephone number x of the telephone set 4x which is located at the location closest to the telephone set of the telephone number w, and calls the telephone set of the telephone number x. Since the subscriber B is not busy, this subscriber can respond to the telephone call at the telephone number x. As a result, the subscriber D has achieved the initial target to communicate with the subscriber B.

Figure 2:
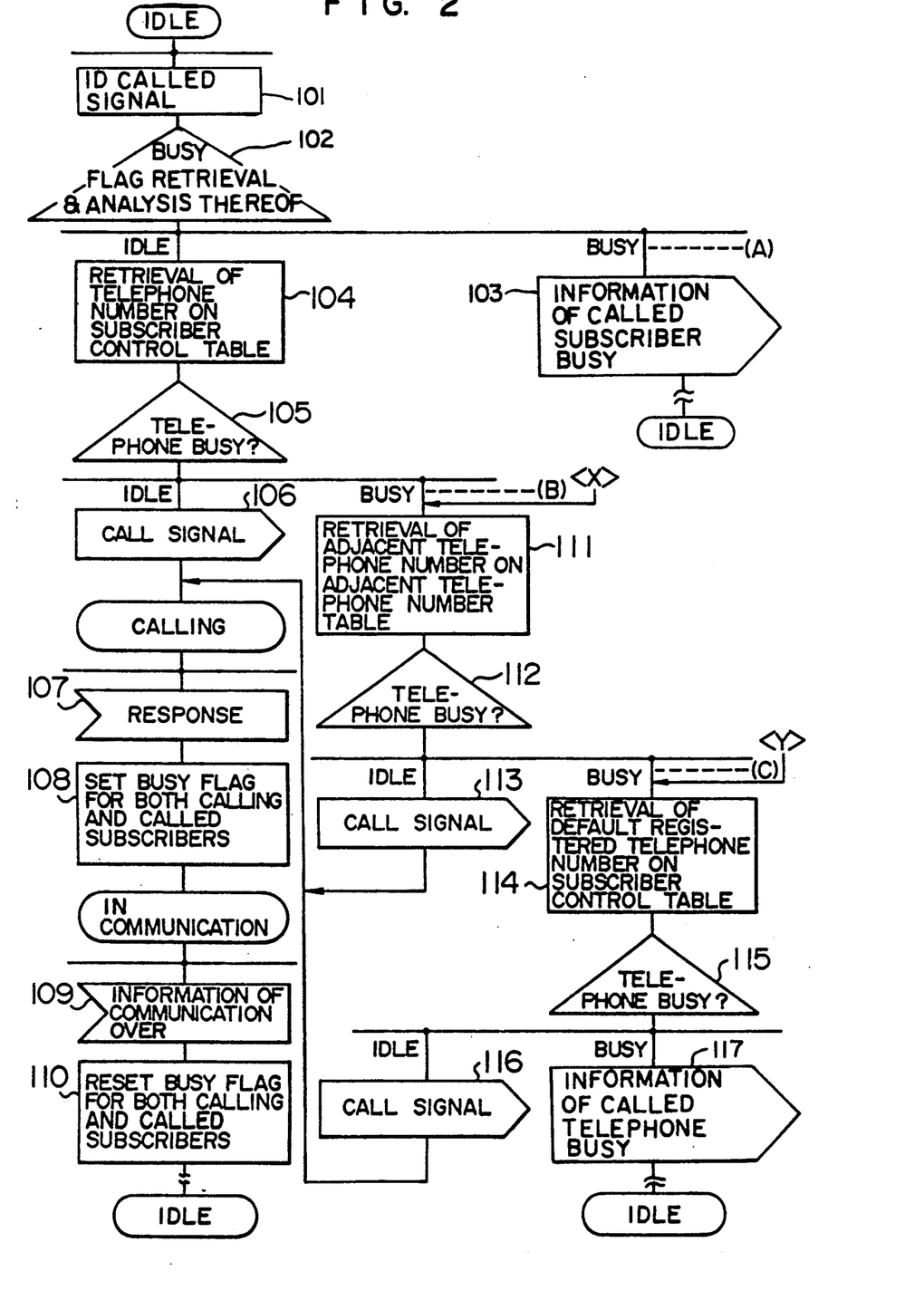
FIG. 2 is an operation flow chart showing the operation at the time of receiving an ID number in the control unit shown in FIG. 1, FIGS. 3 and 4 are operation flow charts which show steps of negotiation between a calling subscriber and the switching equipment when a called subscriber is busy.
Figure 9:
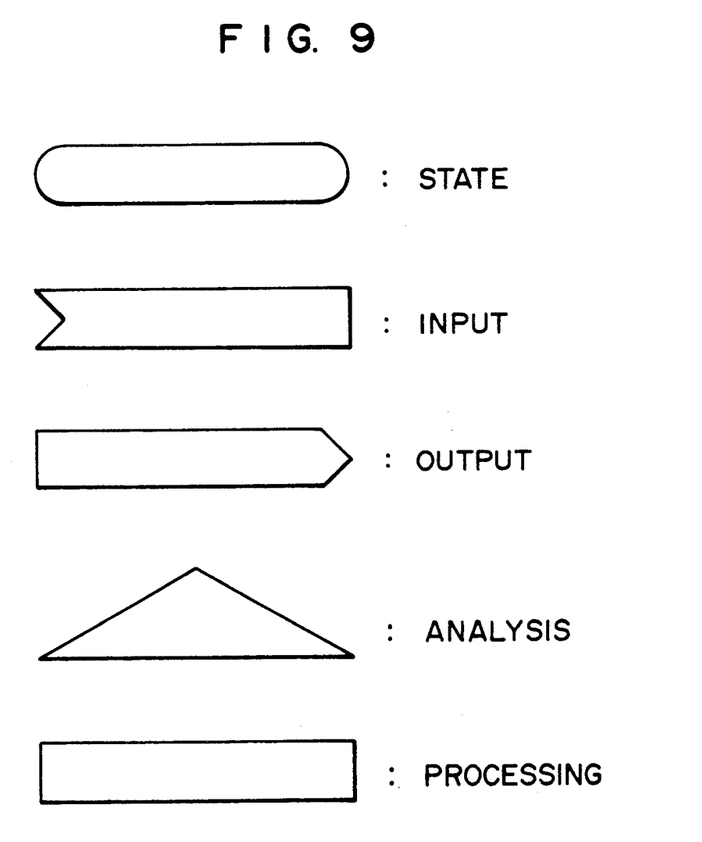
FIG. 9 is an explanatory diagram of the symbols used in the operation flow charts of the present invention.

FIG. 2 is an operation flow chart of the case when the control unit 2 shown in FIG. 1 receives an ID number, and FIG. 9 is an explanatory diagram of the symbols which are used in the operation flow charts.

As shown in FIG. 9, the illustrated symbols are used to represent, from up to down, a block indicating a state, a block indicating an input, a block indicating an output, a block indicating an analysis and a block indicating a processing, respectively.

When the control unit has received an ID signal including an ID number of a called subscriber and an ID number of a calling subscriber in an idle state (Step 101), the control unit 2 retrieves a busy flag corresponding to the ID number of the called subscriber in the subscriber control table 8 (Step 102). There are two states available as a result of a retrieval of a busy flag. When it is known that the called subscriber is busy based on the flag in the column of the corresponding subscriber ID number in the table, the control unit 2 informs the calling subscriber that the called subscriber is busy (Step 103). This is achieved by either sending a tone which indicates that the subscriber is busy or by making a display to indicate that the called subscriber is busy.

According to the conventional system, when a called terminal is busy, the switching equipment transmits a busy tone to the calling subscriber, but this tone is not different from the busy tone which indicates that the terminal itself is busy. According to the present embodiment, the switching equipment transmits a tone which indicates that the called subscriber himself or herself is busy so that the calling subscriber can know that the called terminal is busy and also whether the called subscriber himself or herself is busy or not.

Further, if the calling terminal is configured to include a display portion, the switching equipment can transmit to the calling terminal a signal which indicates that the called subscriber himself or herself is busy so that the calling terminal makes a busy display. By this arrangement, the calling subscriber can discriminate whether the called terminal is busy or the called subscriber himself or herself is busy.

After the end of a busy state, the flagged state in the control table shifts to an idle state.

On the other hand, when the called subscriber is known to be idle as a result of the retrieval, the control unit 2 retrieves a telephone number corresponding to the ID number of the called subscriber (Step 104). When a telephone number corresponding to the ID number of the called subscriber has been detected as a result of the retrieval, the control unit 2 makes an analysis to check whether the telephone set of this telephone number is busy or not (Step 105). There are two alternative states of busy and idle for a result of the analysis. There is a case that a telephone set registered by the subscriber is being used by other subscriber even if a busy flag corresponding to the ID number is "0". When it is known as a result of the analysis that the corresponding subscriber is not using the telephone set, the switching equipment transmits a call signal to the telephone set of the corresponding telephone number (Step 106) and changes the state to a call state. When the control unit 2 receives a response from the telephone set cf the corresponding telephone number in the call state (Step 107), the control unit 2 sets "1" to the busy flags corresponding to both calling and called subscriber in the subscriber control table 8 and changes the state to the busy state (Step 108). When the control unit 2 has received a notice of the communication over from the subscriber (Step 109) in the busy state, the control unit 2 resets to "0" the busy flags corresponding to both calling and called subscribers in the subscriber control table 8 (Step 110). Thereafter, both subscribers are finally shifted to the idle state.

In the meantime, when it is known that the telephone set is busy as a result of the analysis of checking whether the telephone set is busy or not (Step 105), the control unit 2 retrieves an adjacent telephone number in the adjacent telephone number table 9 (Step 111). If an adjacent telephone number is known as a result of the retrieval, the control unit 2 performs an analysis of checking whether the telephone set of this telephone number is busy or not (Step 112).

When it is known as a result of the analysis that the telephone set is not busy, the control unit 2 transmits a call signal to the telephone set of the corresponding telephone number (Step 113) and changes the state to the busy state.

When the corresponding telephone set has responded to the call, the same processing as described above is carried out.

In the meantime, when it is known as a result of the analysis that the telephone set is busy, the control unit 2 retrieves a default registered telephone number corresponding to the ID number of the called subscriber in the subscriber control table 8 (Step 114). When the default registered telephone number is known as a result of the retrieval, the control unit 2 performs an analysis of checking whether the telephone set of this telephone number is busy or not (Step 115). When it is known as a result of the analysis that the telephone set of this default telephone number is not busy, the control unit 2 transmits a call signal to the telephone set of the corresponding telephone number and changes the state to the busy state (Step 116).

In the meantime, when it is known as a result of the analysis that the telephone set is busy, the control unit 2 informs the calling subscriber that the telephone set is busy (Step 117). Thereafter, the telephone set finally shifts to the idle state. The analysis of checking whether the telephone set of the default telephone number is busy or not is performed by retrieving from the telephone number column 8b a number which is identical with the default registered telephone number in the subscriber control table 8. If the busy column 8d corresponding to the telephone number is "0", it is known that this telephone set is idle.

Figure 3:
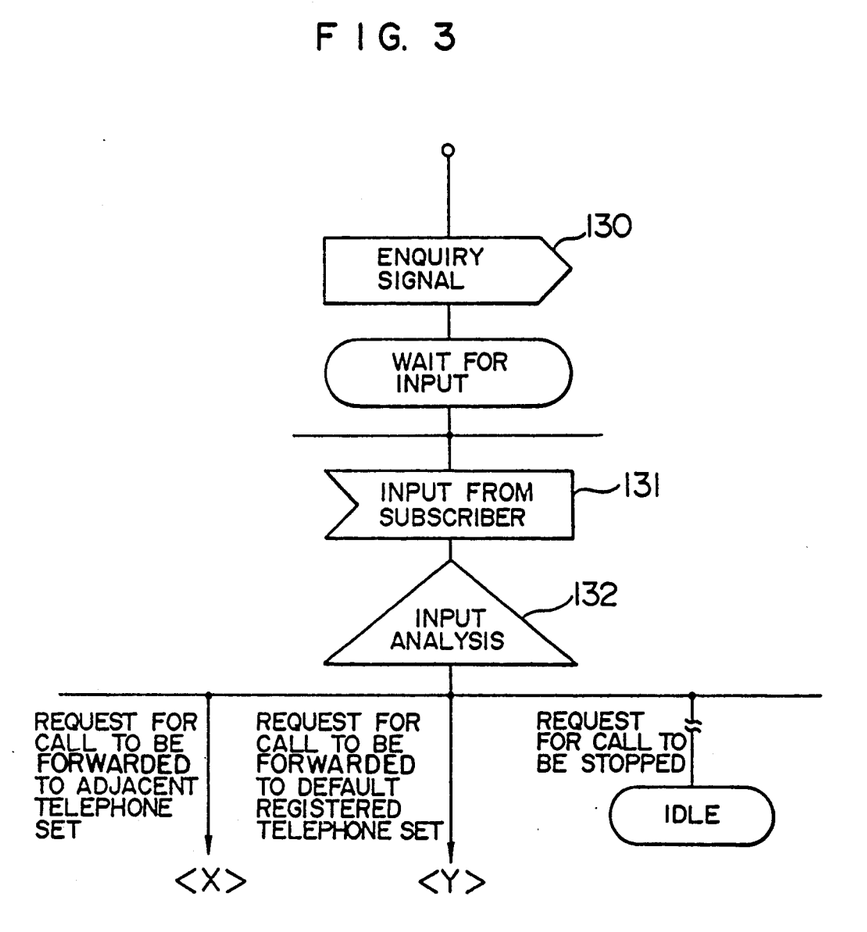
Figure 4:
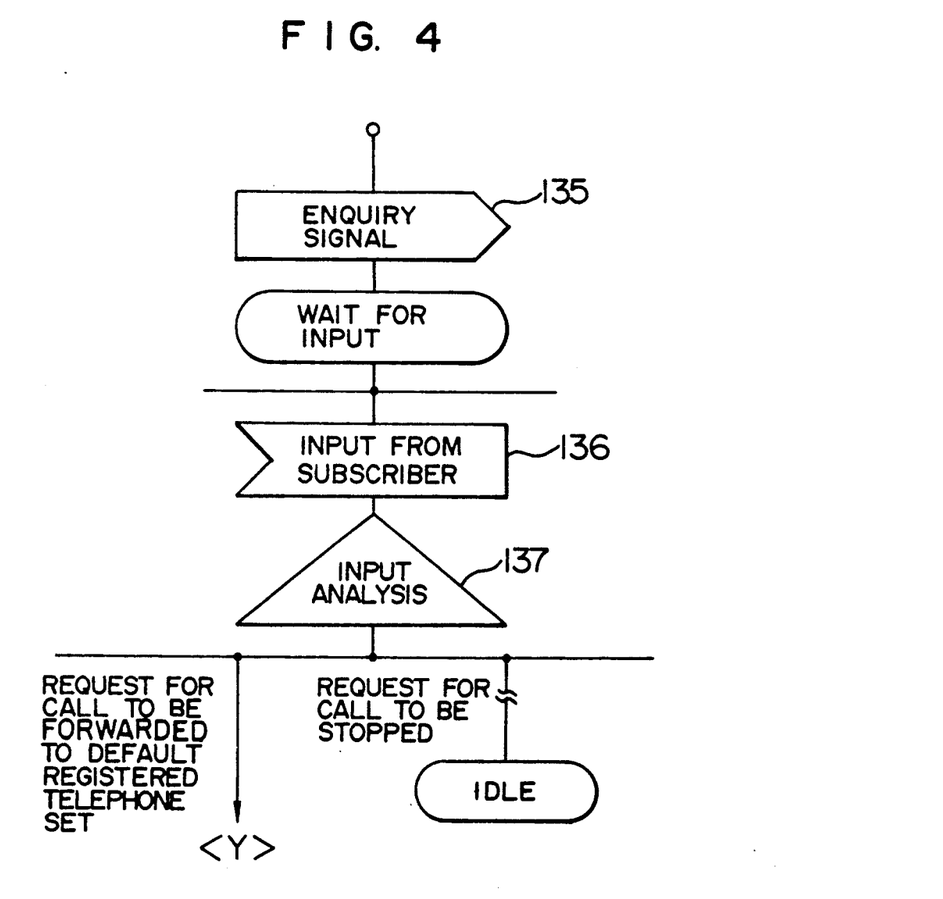

FIGS. 3 and 4 show flow charts illustrating steps of negotiation between a calling subscriber and the switching equipment in the case a called subscriber is busy or a called telephone set is busy, showing examples of application of the present invention. The operation of FIG. 3 is started at the location of (A) or (B) in FIG. 2 and the operation of FIG. 4 is started at the location of (C) in FIG. 2.

Referring to FIG. 3, the operation starts when the busy flag has been set to "1" or when the telephone set of a telephone number corresponding to a called subscriber in the subscriber control table 8 has been busy. First, the switching equipment transmits an enquiry signal to a calling subscriber (Step 130). The enquiry signal is a signal which requests a calling subscriber to select one of three alternatives when a called subscriber is busy or a called telephone set is busy, i.e. (i) the calling subscriber wants the call to be terminated to an adjacent telephone set, (ii) the calling subscriber wants the call to be forwarded to a default registered telephone set and (iii) the calling subscriber wants to stop calling. After this enquiry signal has been transmitted, an input from the calling subscriber is awaited. When there has been an input from the calling subscriber in the input waiting state (Step 131), the switching equipment analyzes to check which one of the above three alternatives has been selected (Step 132). When the result of the analysis shows that the calling subscriber wants the call to be forwarded to an adjacent telephone set, the process continues from the location indicated by <<X>> in the operation flow chart shown in FIG. 2. If the result of the analysis shows that the calling subscriber wants the call to be forwarded to a default registered telephone set, the process continues from the location indicated by <<Y>> in the operation flow chart shown in FIG. 2. If the result of the analysis shows that the calling subscriber wants the call to be stopped, the state finally shifts to the idle state.

As described above, when a called subscriber is busy or when a called telephone set is busy, both a calling subscriber and the control unit 2 of the switching equipment start negotiation about the subsequent processings, and a processing desired by the calling subscriber is carried out as a result.

Referring to FIG. 4, the operation starts when a telephone set of a telephone number registered by a called subscriber is busy in the subscriber control table 8 and also when a telephone set adjacent to the telephone set of the called subscriber is busy in the adjacent telephone number table 9. First, the switching equipment transmits an enquiry signal to a calling subscriber (Step 135). The enquiry signal is a signal which requests the calling subscriber to select one of two alternatives when the telephone sets to which a call is to be forwarded are busy, i.e. (i) the calling subscriber wants the call to be forwarded to a default registered telephone set and (ii) the calling subscriber wants the call to be stopped.

After the above enquiry signal has been transmitted, the switching equipment waits for an input from the calling subscriber. When there has been an input from the calling subscriber in the input waiting state (Step 136), the switching equipment performs an analysis of the input (Step 137) and judges which one of the above two alternatives the calling subscriber has selected. If the result of the analysis shows that the calling subscriber wants the call to be terminated to a default registered telephone set, the processing continues from the location indicated by <<Y>> in the operation flow chart shown in FIG. 2. If the result of the analysis shows that the calling subscriber wants the call to be stopped, the state finally shifts to the idle state. As described above, when called telephone sets are busy, both a calling subscriber and the control unit 2 of the switching equipment start negotiation about the subsequent processings, and a processing desired by the calling subscriber is carried out as a result.

Figure 5:
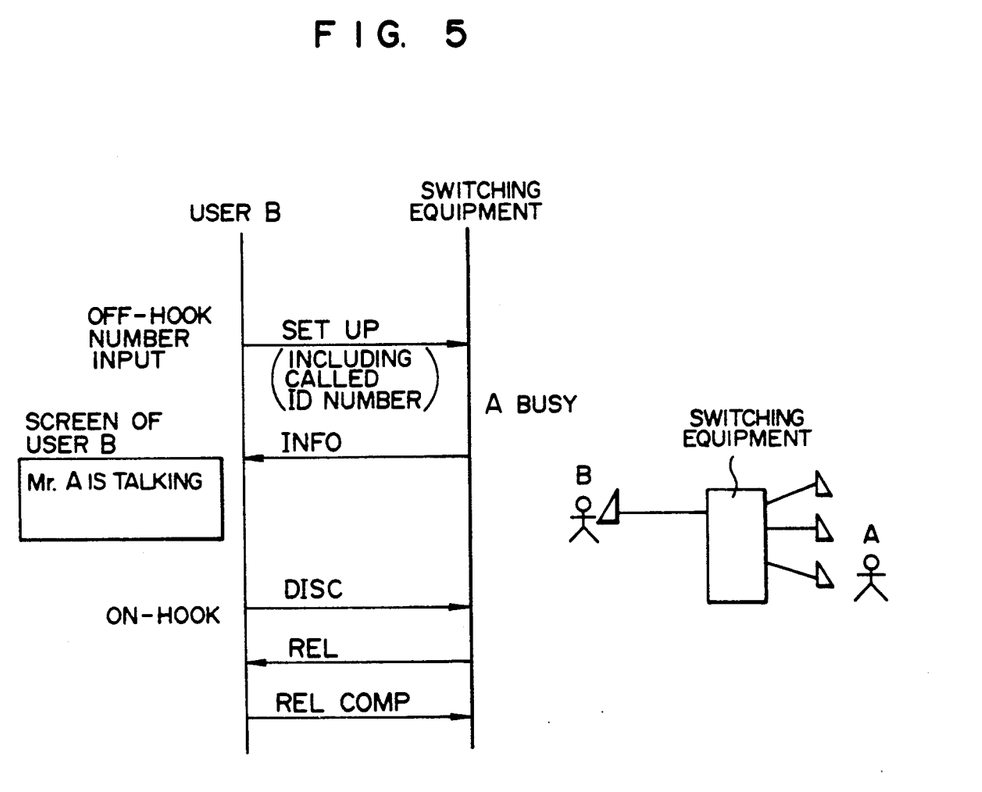
FIG. 5 is a sequence diagram of a busy display which is used in one embodiment of the present invention.

FIG. 5 shows an example of the sequence of a layer 3 signal for a terminal which has a display section. This illustrates the sequence of the case where the interface between the switching equipment and the terminal is an integrated service digital network (ISDN) user interface when a display is made that a called subscriber is busy.

Figure 6:
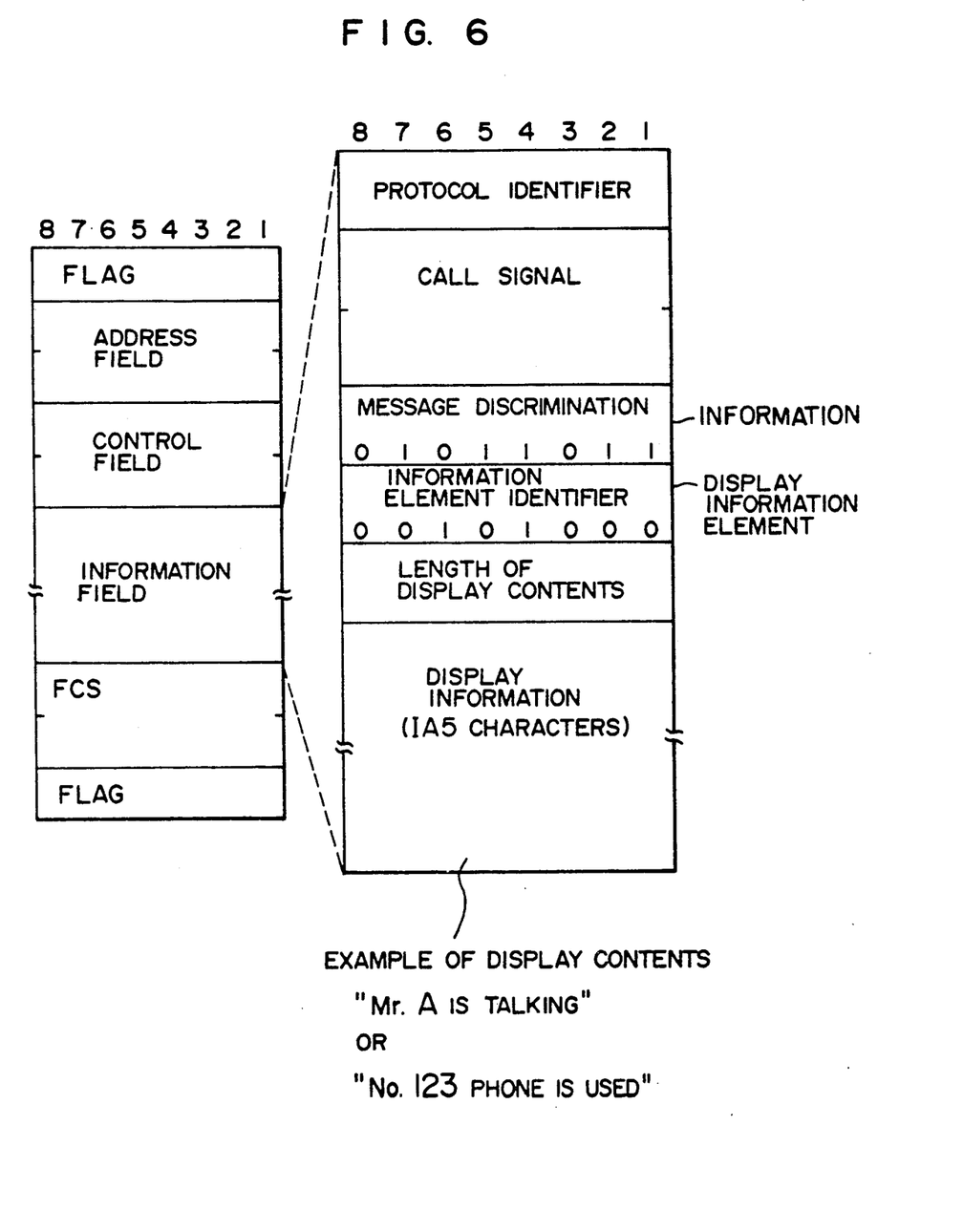
FIG. 6 is a signal formatting diagram which shows display contents of FIG. 5.

FIG. 6 shows an example of the format of a signal for showing the contents of information to be displayed in the display section. This illustrates an example of transmitting a display screen by using an information message which is a message of the ISDN protocal layer 3.

Figure 7:
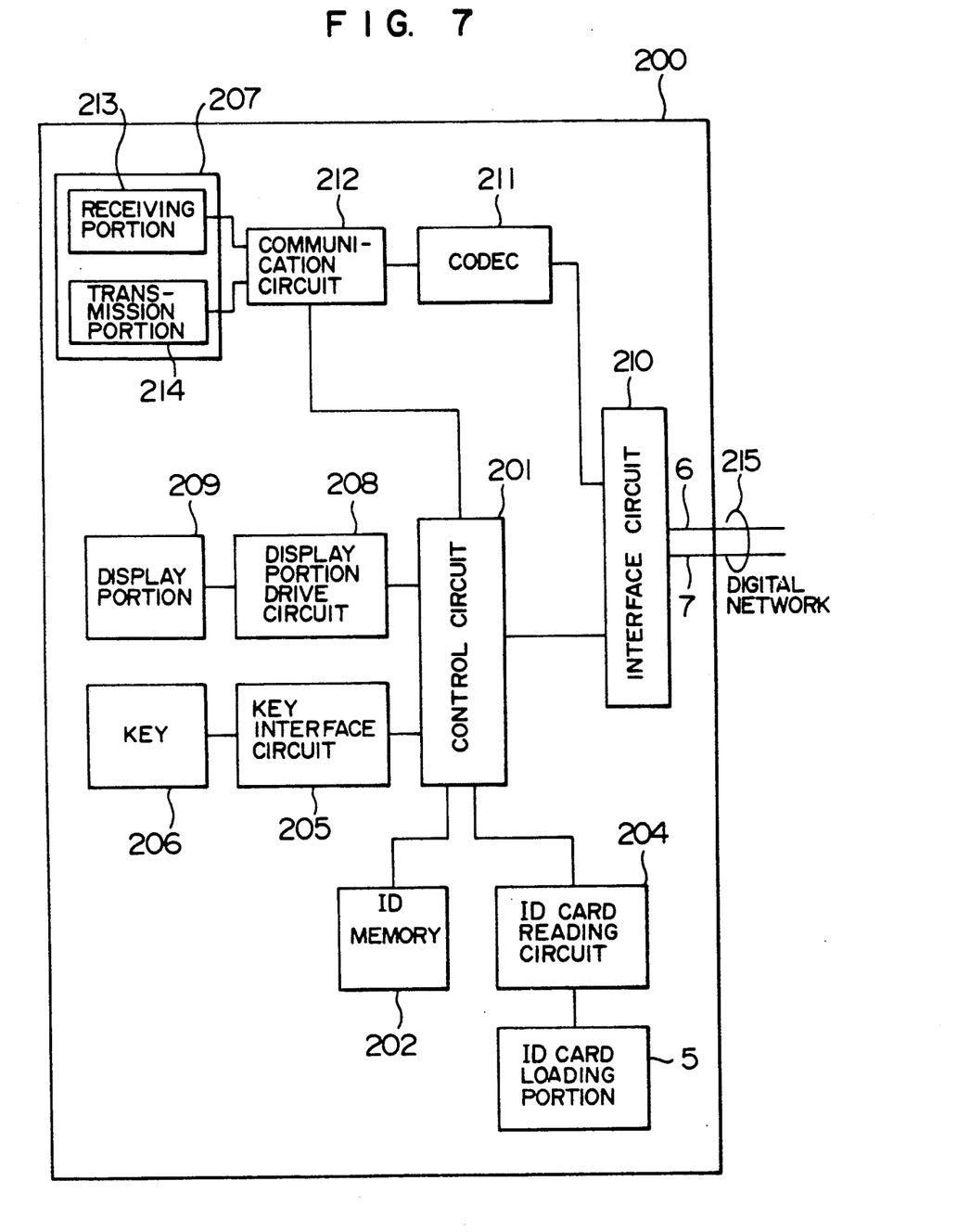
FIG. 7 is a block diagram showing an example of the configuration of a telephone set in FIG. 1.

FIG. 7 is a block diagram of the telephone set shown in FIG. 1.

In FIG. 7, 200 designate a telephone set, 201 a control circuit for controlling the whole inside of the telephone set, 202 a memory for storing ID numbers and the like, 204 a reading circuit for reading the contents of the ID card, 5 an ID card loading portion, 205 a key interface circuit for inputting a key input from a key dial unit to the control circuit 201, 206 a key dial unit for inputting a dial number of the other subscriber, ID numbers, etc., 208 a display portion drive circuit for outputting a display output data from the control circuit 201 to the display portion, 209 a display portion for displaying an input data, an output data, a negotiation data for negotiating with the switching equipment, etc., 210 an interface circuit of a subscriber line, 211 a CODEC for carrying out digital-analog conversion of an audio signal, 212 a communication circuit for making communication between a subscriber of the telephone set and the other subscriber, 207 a hand set, 213 a receiver, 214 a transmitter, 215 a digital subscriber line, 6 an information channel for transmitting communication information in the digital subscriber line 215, and 7 a control signal channel for transmitting a control signal.

Referring to FIG. 7, when a subscriber inserts an ID card storing his or her own ID number into the ID card loading portion 5, the ID card contents reading circuit 204 reads the ID number stored in the ID card. When the read ID number has been transferred to the control circuit 201, the control circuit 201 stores the ID number in the memory 202. At this time, the state of the control circuit 201 is the same as the state when the subscriber raised the hand set 207 so that a key can be inputted at any time.

After the subscriber has finished inputting the ID number of the called subscriber or the telephone number of the called subscriber, the control circuit 201 reads out a call signal including the ID number of the calling subscriber stored in the memory together with the ID number or the telephone number of the called subscriber that has been key-inputted, and transmits these numbers to the switching equipment through the interface circuit 210 and the control information channel 7.

Figure 8:
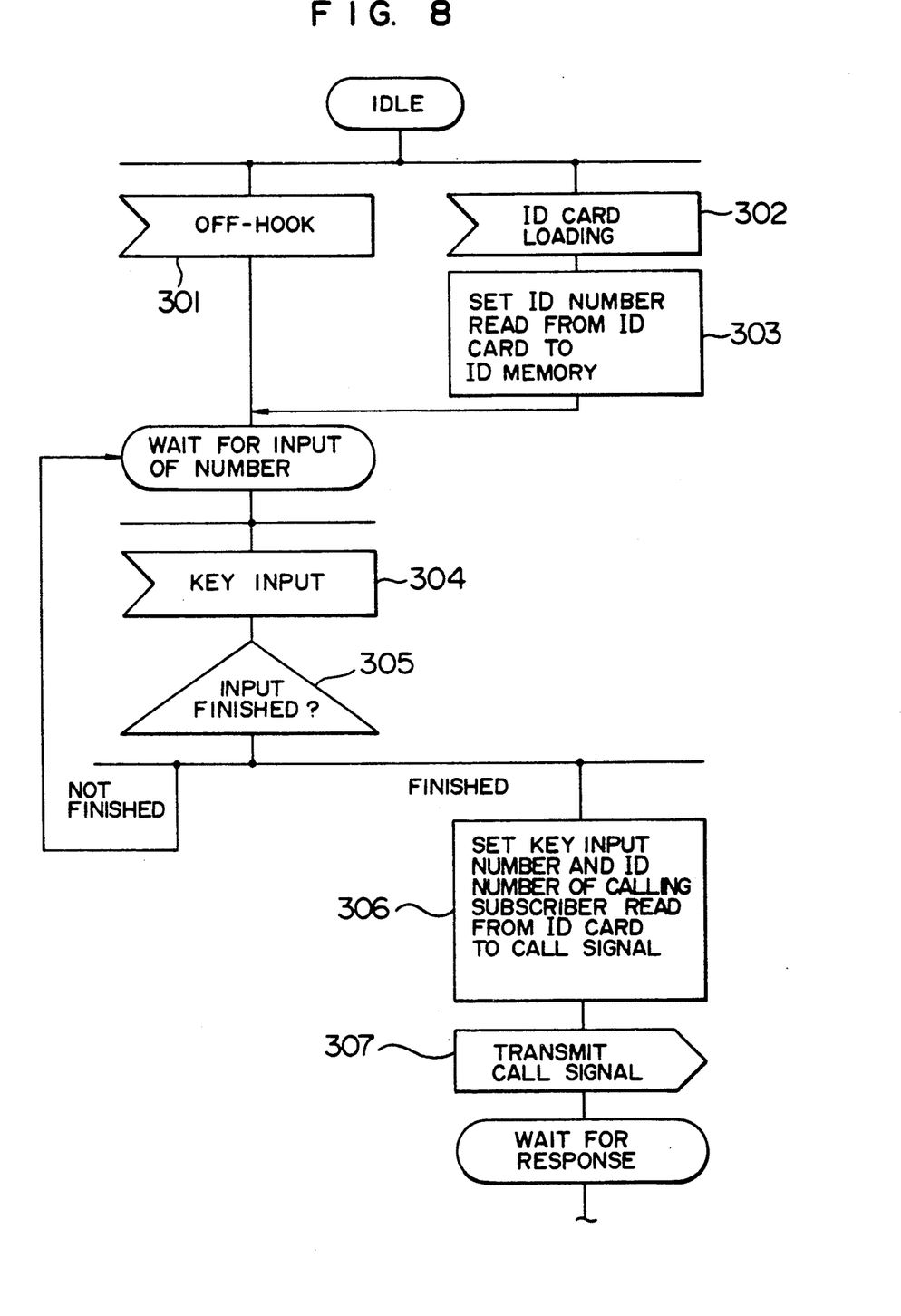
FIG. 8 is an operation flow chart of the control circuit in FIG. 7.

FIG. 8 is an operation flow chart of the control circuit in FIG. 7.

When the control circuit 201 detects off-hook of a subscriber after an idle state (Step 301), the state changes to the number input waiting state. In the mean time, when an ID card loading has been detected after an idle state (Step 302), the control circuit 201 stores the ID number read out from the ID card in the memory 202 and sets the ID number (Step 303). Then, the state changes to the number input waiting state in the manner similar to the case when off-hook has been detected after an idle state.

When a subscriber has made a key input in the number input waiting state (Step 304), the control circuit 201 analyzes to check whether the input has been finished or not (Step 305). If the key input has not been finished, the state changes to the number input waiting state. If the key input has been finished, the control circuit 201 sets a call signal. In other words, the control circuit sets the key-inputted number (the called subscriber number) and the ID number of the called subscriber reads out from the ID card (the ID number set in the memory 202) (Step 306), and transmits the set call signal (Step 307). Then, the state changes to a response waiting state.

As described above, since the control circuit 201 in the telephone set 200 automatically carries out the processings shown in FIG. 8, a subscriber does not need to key-input his or her own ID number when making a call and only needs to key-input an ID number of a called subscriber.

The present embodiment has the following advantages. (a) Since the switching equipment has a subscriber control table to manage positions of subscribers whether they are busy or not by corresponding them to their ID numbers, the switching equipment can provide services corresponding to the subscriber as well as services corresponding to telephone numbers. (b) There is a situation that when a subscriber has called other subscriber by designating an ID number of the called subscriber from a calling terminal, a terminal corresponding to the called subscriber having the designated ID number is busy, but the called subscriber having this ID number is not busy. In such a case, the switching equipment can terminate the call to another terminal which is adjacent to the terminal corresponding to the called subscriber who has the designated ID number. Therefore, the calling subscriber can communicate with the called subscriber in the above situation. (c) There is also another example of a service of the switching equipment in such a situation that when a subscriber has called other subscriber by designating an ID number of the called subscriber from a calling terminal, a terminal corresponding to the called subscriber having the designated ID number is busy but the called subscriber having this ID number is not busy or the terminal corresponding to the called subscriber having the designated ID number is busy (and whether the called subscriber is busy or not is not clear). In such a case, the switching equipment can terminate the call to a default terminal which has been registered in advance corresponding to the ID number. Therefore, the calling subscriber can transfer a message to a subscriber who has responded to the call on behalf of the called subscriber at the default terminal. (d) A telephone set according to the present embodiment requires a calling subscriber only to insert his or her ID card without inputting his or her own ID number. Therefore, the operation at the time of a telephone call can be simplified.

What is claimed is:

1. A switching system having a subscriber state management function according to which when a calling subscriber inputs an identification (ID) number of a called subscriber to a terminal at the time of making a call, said terminal transmits the ID number of said called subscriber to switching equipment so that said switching equipment receives said ID number and connects between the calling terminal and the called terminal, said switching equipment including:
a subscriber control table having columns for registering a subscriber ID number, a telephone number of a terminal corresponding to said subscriber ID number, a default telephone number which has been registered in advance by a subscriber having said ID number and a busy flag for indicating whether the subscriber having said ID number himself or herself is busy;
means for changing a registration state corresponding to an ID number of said calling subscriber in said subscriber control table from an idle state to a busy state after said calling subscriber has inputted the ID number of the called subscriber together with the ID number of the calling subscriber himself or herself to a terminal and managing the idle and busy states of the subscriber corresponding to the ID number; and
means for retrieving said subscriber control table when the switching equipment has received a call signal which designates the ID number of the called subscriber from the calling subscriber and for generating a signal to forward the call to a default terminal which as been registered in advance by the called subscriber having said ID number when the terminal corresponding to the called subscriber having said ID number is busy and also when the called subscriber having the ID number himself or herself is not busy.

2. The switching system having a subscriber state management function according to claim 1 further including:
an adjacent telephone number table having columns for registering the telephone number at each terminal and a telephone number of a telephone set adjacent to said terminal,
wherein when the switching equipment has received the call signal which designates the ID number of the called subscriber from the calling subscriber the switching equipment retrieves said subscriber control table, and when the terminal corresponding to the called subscriber having said ID number is busy and the called subscriber having said ID number himself or herself is not busy, as a result the switching equipment retrieves said adjacent telephone number table so that the call is forwarded to the terminal adjacent to the called busy terminal.

3. The switching system having a subscriber state management function according to claim 1 further including:
an adjacent telephone number table having columns for registering the telephone number at each terminal and a telephone number of a telephone set adjacent to said terminal,
wherein when the switching equipment has received the call signal which designates the ID number of the called subscriber from the calling subscriber the switching equipment retrieves said subscriber control table, and when the terminal corresponding to the called subscriber having said ID number is busy and the called subscriber having said ID number himself or herself is not busy, as a result the switching equipment forwards the call to the default terminal which has been registered in advance by the called subscriber having said ID number or the switching equipment retrieves said adjacent telephone number table so that the call is forwarded to the terminal adjacent to the called busy terminal.

4. The switching system having a subscriber state management function according to claim 1, wherein when the switching equipment has received the ID number of the called subscriber from the calling subscriber the switching equipment retrieves a number identical with said called ID number from the ID number column registered in said subscriber control table and whereafter a judging means of the switching circuit judges whether the called subscriber himself or herself is busy or not from the busy flag column corresponding to said ID number, and informs the calling subscriber that the called subscriber himself or herself is busy when the called subscriber himself or herself is busy as a result of the judgment.

5. The switching system having a subscriber state management function according to claim 4, wherein said switching equipment informs the calling subscriber that the called subscriber is busy by using a busy tone generated by a tone generator means to indicate that the called subscriber is busy which is separate form a busy tone generated by the tone generator means that indicates that the called terminal is busy.

6. The switching system having a subscriber state management function according to claim 4, wherein said switching equipment indicates that the called subscriber himself or herself is busy at a display portion of the calling terminal of the calling subscriber.

7. A switching system having a subscriber state management function according to which when a calling subscriber transmits an ID number of a called subscriber and an ID number of the calling subscriber from a calling terminal to switching equipment, the switching equipment receives said ID numbers to connect between the calling terminal and the called terminal, the switching system including:
an ID card, wherein when the calling subscriber inserts the ID card storing the ID number of the calling subscriber into a terminal, the terminal takes an on-hook dialing state, and when the calling subscriber further inputs the ID number of the called subscriber, the terminal transmits the ID number of the called subscriber together with the ID number of the calling subscriber which has been read from the ID card to the switching equipment so that the switching equipment registers that the calling subscriber is busy to the subscriber control table in the switching equipment.

8. A switching method in a switching system having a subscriber state management function according to which when a calling subscriber inputs an identification (ID) number of a called subscriber to a terminal at the time of making a call, said terminal transmits the ID number of said called subscriber to switching equipment so that said switching equipment receives said ID number and connects the calling terminal and the called terminal, said switching method comprising the steps of:

applying a subscriber control table in said switching equipment having columns for registering a subscriber ID number, a telephone number of a terminal corresponding to said subscriber ID number, a default telephone number which has been registered in advance by a subscriber having said ID number and a busy flag for showing whether the subscriber having said ID number himself or herself is busy;

changing a registration state corresponding to an ID number of said calling subscriber in said subscriber control table from an idle state to a busy state after said calling subscriber has inputted the ID number of the called subscriber together with the ID number of he calling subscriber to a terminal and for managing the idle and busy states of the subscriber corresponding to the ID number; and retrieving said subscriber control table when the switching equipment has received a call signal which designates the ID number of the called subscriber from the calling subscriber and for forwarding the call to a default terminal which has been registered in advance by the called subscriber having said ID number when the terminal corresponding to the called subscriber having said ID number is busy and also when the called subscriber having the ID number himself or herself is not busy.

* * * * *

UNITED STATES PATENT AND TRADEMARK OFFICE
CERTIFICATE OF CORRECTION

PATENT NO. : 5,197,096

DATED : March 23, 1993

INVENTOR(S) : Tetsuo Sakuma, et al.

It is certified that error appears in the above-identified patent and that said Letters Patent is hereby corrected as shown below:

Claim 1, column 11, line 51, delete "as" and substitute therefor --has--.

Claim 5, column 12, line 48, delete "form" and substitute therefor --from--.

Claim 8, column 14, line 9, delete "he" and substitute therefor --the--.

Signed and Sealed this

Fifteenth Day of February, 1994

Attest:

BRUCE LEHMAN

*Attesting Officer*     *Commissioner of Patents and Trademarks*